E. B. BOWLING.
RESILIENT AUTOMOBILE FENDER.
APPLICATION FILED JUNE 5, 1918.
1,306,742.
Patented June 17, 1919.
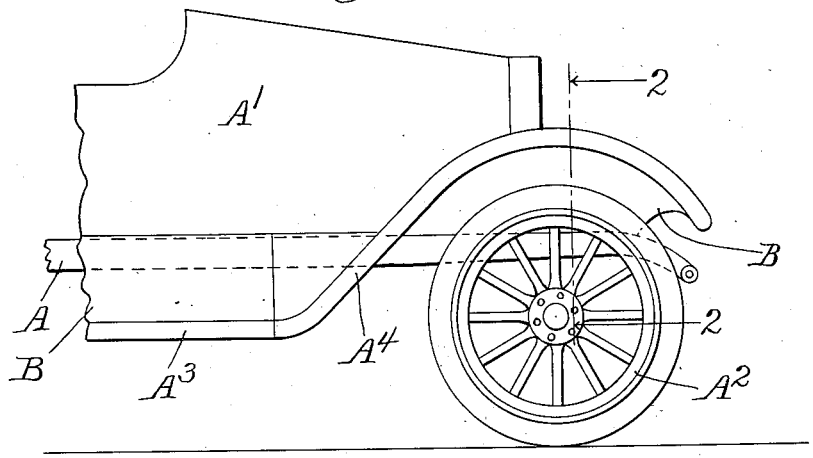
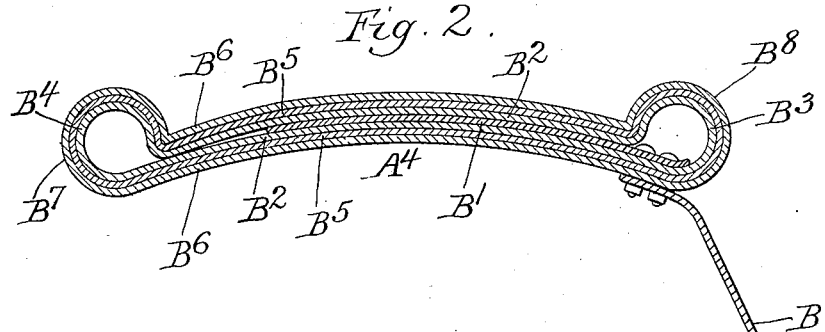
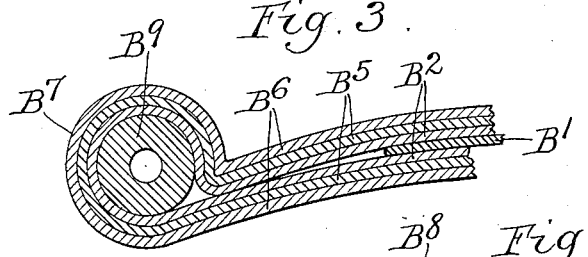
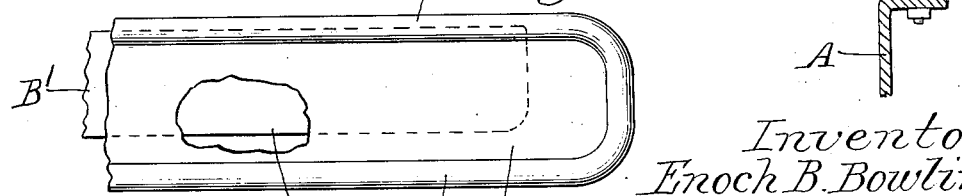
Witness.
Edward T. Wray.
Inventor.
Enoch B. Bowling
by Parker & Carter
Attorneys.

UNITED STATES PATENT OFFICE.

ENOCH B. BOWLING, OF CHICAGO, ILLINOIS.

RESILIENT AUTOMOBILE-FENDER.

1,306,742.  Specification of Letters Patent.  Patented June 17, 1919.

Application filed June 5, 1918. Serial No. 238,287.

*To all whom it may concern:*

Be it known that I, ENOCH B. BOWLING, a citizen of the United States, residing at Chicago, in the county of Cook and State of Illinois, have invented a certain new and useful Improvement in Resilient Automobile-Fenders, of which the following is a specification.

My invention relates to improvements in resilient fenders for road vehicles and the like and has for one object to provide a new and improved form of resilient fender which will be sufficiently unbreakable, which will cushion any blow upon the vehicle and which will always return to its normal original shape when distorted by impact or collision. Another object is to provide a motor vehicle fender which will not rust and the life of which will be as long as the life of the vehicle upon which it is placed. Other objects of my invention will appear from time to time in the specification.

My invention is illustrated more or less diagrammatically in the accompanying drawings, wherein—

Figure 1 is a side elevation of the front of a motor vehicle showing my fender in position;

Fig. 2 is a section on an enlarged scale on the line 2—2 of Fig. 1;

Fig. 3 is a section similar to Fig. 2 showing a slightly modified form;

Fig. 4 is a detailed plan view of the front end of the fender showing parts broken away.

Like parts are indicated by like characters in all the drawings:—

The automobile or vehicle frame A carries the body $A^1$. It is supported on the wheels $A^2$ and carries the running board $A^3$ and fender $A^4$. It will be understood, of course, that the running board and fender for the purposes of my invention are the same. They may or may not be made of the same material, preferably they would be and would be made in the same manner and the running board would be a little stiffer than the fender so that it would carry the load of a person stepping on it, but still would be free to operate in a resilient yielding and elastic manner just as does the fender itself. I have illustrated my invention in detail by showing a section through the fender and a section of a running board would show substantially the same thing, and for the purposes of my invention I wish it understood that the fender and running board are identical and that fender is a generic term covering any device projecting out from the frame for the purpose of catching and deflecting dust and dirt thrown up by the wheels and for the purpose of covering and protecting the frame.

Projecting outwardly and upwardly or downwardly as the case may be, from the frame A is a rigid metal skirt B bolted in place as indicated. The fender itself or the running board itself is bolted or riveted or otherwise attached to this skirt B. This fender or running board is made up of a single flat or curved strip of metal or other rigid material $B^1$ serving as a back bone and extending substantially throughout the length of the fender and running board, but terminating preferably short of the forward end and not extending clear out to the outer side. $B^2$ is a rubber coating surrounding the back bone or plate $B^1$. At either side this coating terminates in a loop or ring $B^3$, $B^4$ forming the base of a bead. $B^5$ is a frictioned fabric surrounding and inclosing the rubber base, and the metallic back bone and $B^6$ is a rubber covering inclosing and protecting the frictioned fabric. It will be noted that this forms a fender or running board with a hollow bead $B^7$ on the outside and where the fender is above the frame will be a hollow bead $B^8$, but this, of course, will be dispensed with where the running board portion of the fender is located and where the fender dips down close to the frame. This hollow bead may be closed by a resilient plug $B^9$ as indicated in Fig. 3 or it may be merely an air pocket as indicated in Fig. 2.

A rubber sheet is first built up around the back bone and then a plurality of frictioned or rubberized fabric is laid on and then the coating. The whole device is then vulcanized into a unitary whole or mass and a fender or running board is formed having a stiff rigid back bone with a flexible cushioned portion which is so constituted that when distorted, bent or crushed, as soon as the pressure is removed it flies back to its original shape and position.

Because fenders are likely to be distorted from blows from the front, the forward portion is not reinforced by the metal, that is, the metal terminates short of the forward portion and this forward tip is supported only by a strip of the rubber fabric and is quite sufficient to protect it under ordinary conditions and leave it free to give when struck.

Even if the whole fender and running board is made up according to my invention of rigid back bone supporting a flexible structure the entire apparatus will operate just as if the running board and fender were rigid so far as ordinary loads and service are concerned because the built up structure will be strong enough to support any ordinary load which would be put upon it, but the elasticity of the parts will be such that when they receive an excess load then they yield.

It will be understood, of course, that while my preferred form calls for a back bone of metal with a rubber and frictioned fabric pocket or cover building up the fender running board, still the back bone might be made of any suitable strong and light material and the covering might be of any suitable resilient or flexible or elastic material. It might be cork or painted cloth or gum or some synthetic rubber-like compound. In other words, while I prefer rubber and fabric, I do not wish to be so limited.

In use this fender will be painted with rubber or elastic paint and obviously if the fender collapses the paint collapses with it. When the fender assumes its original position the paint does likewise. If the blow has actually bent the back bone, that may be straightened out without removing the resilient envelop and no one would know that anything had taken place if the job was well done.

The fender where it takes the form of or is used as a running board may or may not be provided with a cushion surrounding the periphery. This is not so necessary for the central portion of the fender where it acts as a running board because blows generally come on the front or rear end of the car and not on the center.

I claim:

1. A fender for road vehicles and the like comprising a rigid base, a resilient cover therefor completely inclosing the base and extending upwardly therefrom beyond the outer edge thereof.

2. A fender for road vehicles and the like comprising a rigid base, a resilient cover therefor completely inclosing the base and extending upwardly therefrom beyond the outer edge thereof, said cover terminating in an enlarged cushion bead removed from and outside of the base.

3. A fender for road vehicles and the like comprising a rigid base, a resilient cover therefor completely inclosing the base and extending upwardly therefrom beyond the outer edge thereof, said cover comprising a rubber coating for the base, frictioned fabric surrounding the rubber coating and a rubber coating for the frictioned fabric.

4. A fender for road vehicles and the like comprising a rigid base, a resilient cover therefor completely inclosing the base and extending upwardly therefrom beyond the outer edge thereof, said cover terminating in an enlarged cushion bead removed from and outside of the base, said cover comprising a rubber coating for the base, frictioned fabric surrounding the rubber coating and a rubber coating for the frictioned fabric.

5. A fender for road vehicles and the like comprising a laterally extended rigid plate, a yielding elastic cover completely inclosing it and projecting outwardly away from one side thereof and means for holding the other side of the plate in fixed relation with the vehicle.

6. A fender for road vehicles and the like comprising a laterally extended rigid plate, a yielding elastic cover completely inclosing it and projecting outwardly away from one side thereof, means for holding the other side of the plate in fixed relation with the vehicle and an enlarged cushion surrounding the periphery of the fender.

7. A fender for road vehicles and the like comprising a laterally extended rigid plate, a yielding elastic cover completely inclosing it and projecting outwardly away from one side thereof, means for holding the other side of the plate in fixed relation with the vehicle and an enlarged cushion surrounding the periphery of the fender, said cushion comprising an air pocket inclosed within the resilient material.

8. A fender for road vehicles and the like comprising a laterally extended rigid plate, a yielding elastic cover completely inclosing it and projecting outwardly away from one side thereof, means for holding the other side of the plate in fixed relation with the vehicle and an enlarged cushion surrounding the periphery of the fender, said cushion comprising a pocket inclosed within the resilient material and a resilient filling therefor.

9. A fender for road vehicles and the like comprising a rigid base, a yielding elastic cover therefor extending outwardly beyond one side thereof and projecting forwardly beyond the front thereof.

10. A fender for road vehicles and the like comprising a rigid base, a yielding elastic cover therefor extending outwardly beyond one side thereof and projecting forwardly beyond the front thereof and a yielding elastic cushion in the periphery of said fender.

11. A fender for vehicles and the like comprising a rigid base, a resilient cover therefor completely inclosing it, and extending outwardly beyond it, the resilient cover being of such strength as to rigidly resist all ordinary loads tending to cause distortion but to yield when excess loads or pressures are applied and then when the load is removed to resume its original shape and position.

12. An elastic yielding fender for road vehicles and the like comprising a rigid base, and a yielding elastic cover therefor for completely inclosing it, and extending outwardly beyond its edge.

In testimony whereof I affix my signature in the presence of two witnesses this third day of June, 1918.

ENOCH B. BOWLING.

Witnesses:
 LAUREL D. MEYER,
 MARION L. INGRAHAM,